United States Patent
Fishman

(10) Patent No.: US 7,753,986 B2
(45) Date of Patent: Jul. 13, 2010

(54) TITANIUM PROCESSING WITH ELECTRIC INDUCTION ENERGY

(75) Inventor: Oleg S. Fishman, Maple Glen, PA (US)

(73) Assignee: Inductotherm Corp., Rancocas, NJ (US)

( * ) Notice: Subject to any disclaimer, the term of this patent is extended or adjusted under 35 U.S.C. 154(b) by 231 days.

(21) Appl. No.: 11/684,878

(22) Filed: Mar. 12, 2007

(65) Prior Publication Data

US 2008/0178705 A1 Jul. 31, 2008

Related U.S. Application Data

(60) Provisional application No. 60/887,434, filed on Jan. 31, 2007.

(51) Int. Cl.
*C22B 4/00* (2006.01)
(52) U.S. Cl. ............ 75/10.18; 75/10.67; 75/10.14
(58) Field of Classification Search ............. 75/10.18, 75/10.67, 10.14
See application file for complete search history.

(56) References Cited

U.S. PATENT DOCUMENTS

| | | | |
|---|---|---|---|
| 2,277,268 A * | 3/1942 | Goerner | 164/56.1 |
| 2,778,726 A * | 1/1957 | Winter, Jr. et al. | 75/612 |
| 4,058,668 A | 11/1977 | Clites | |
| 4,902,341 A * | 2/1990 | Okudaira et al. | 75/10.18 |
| 5,308,378 A | 5/1994 | Evans et al. | |
| 5,460,642 A | 10/1995 | Leland | |
| 5,772,724 A | 6/1998 | Inoue et al. | |
| 6,989,041 B2 | 1/2006 | Ito et al. | |
| 7,156,974 B2 * | 1/2007 | Strezov et al. | 205/398 |
| 2005/0167075 A1 | 8/2005 | Eckert | |
| 2007/0147463 A1 * | 6/2007 | Roberts et al. | 373/147 |

* cited by examiner

*Primary Examiner*—Roy King
*Assistant Examiner*—Jie Yang
(74) *Attorney, Agent, or Firm*—Philip O. Post

(57) ABSTRACT

The present invention relates to a process wherein an intermediate form of titanium, namely titanium sponge, is produced by reduction of a feedstock of titanium in a reactant liquid bath, where the feedstock, titanium tetrachloride, is reduced by molten magnesium to titanium sponge, and the reactant liquid bath is inductively stirred during the reduction process. The reduction process with induced stirring is performed in an electric induction cold crucible, with or without a liner. Subsequent purification and melting of the titanium sponge can be accomplished in the electric induction cold crucible so that purified titanium can be supplied from the cold crucible.

2 Claims, 2 Drawing Sheets

TITANIUM PROCESSING WITH ELECTRIC INDUCTION ENERGY

CROSS-REFERENCE TO RELATED APPLICATIONS

This application claims the benefit of U.S. Provisional Application No. 60/887,434, filed Jan. 31, 2007, hereby incorporated by reference in its entirety.

FIELD OF THE INVENTION

The present invention relates to methods for processing a Group IVB metal, such as titanium, wherein one or more of the process steps utilizes electric induction stirring, heating or melting energy.

BACKGROUND OF THE INVENTION

Group IVB metals include titanium, zirconium and hafnium. One method of producing a purified Group IVB metal, such as metallic titanium, includes the Kroll process, which consists of a reduction stage, purification stage and uniform granulation stage. In the reduction stage, liquid titanium tetrachloride is added to molten magnesium in a reduction vessel whereby the titanium tetrachloride is reduced to porous titanium sponge, with magnesium dichloride as a byproduct. The reaction takes place under an inert atmosphere. Liquid titanium tetrachloride is a feedstock that is produced by carbonation/chlorination of titanium ore. The magnesium dichloride is withdrawn from the vessel to leave titanium sponge with impurities, such as unreacted magnesium and remaining magnesium chloride. Batch production of impure titanium sponge by the Kroll process has a low production rate. For example the reduction process may take several days to produce a few tons of impure titanium sponge. Furthermore after production of the impure titanium sponge, impurities must be removed in the purification stage, which typically involves heating the titanium sponge, either in the reduction vessel, or after scrapping the titanium sponge out of the reduction vessel, to evaporate the remaining magnesium and magnesium chloride. Finally the end product of the Kroll process, namely an intermediate form of metallic titanium comprising a uniform, granulated titanium sponge, is produced typically by crushing and blending. This titanium sponge is used as feesdstock for melting into titanium ingots, typically by an arc or electron beam melting process. The ingots are processed into final products, such as titanium pipes and sheets.

One object of the present invention is to increase the production rate for reducing a feedstock into a sponge form of a Group IVB metal, for example, where the feedstock is titanium tetrachloride and the sponge form is titanium sponge.

Another object of the present invention is to combine the reduction, purification and melting stages for producing a purified Group IVB metal in a single process vessel.

SUMMARY OF THE INVENTION

In one aspect the present invention is a process for forming metallic titanium in purified form. An inert atmosphere is provided in an electric induction cold crucible surrounded by one or more induction coils. Magnesium is placed in the electric induction cold crucible and titanium tetrachloride is added to the magnesium. A stirring alternating current is supplied to at least one of the one or more induction coils to induce circulation of the magnesium and titanium tetrachloride in the electric induction cold crucible. The titanium tetrachloride is reduced to titanium sponge and one, or more, byproducts are produced including magnesium dichloride. The byproducts are removed from the electric induction cold crucible and the inert atmosphere is purged from the electric induction cold crucible. A heating alternating current is supplied to at least one of the one or more induction coils to release one or more impurities from the titanium sponge to form a purified titanium sponge in the electric induction cold crucible. The one or more impurities are removed from the electric induction cold crucible. A vacuum is drawn in the electric induction cold crucible and a melting alternating current is supplied to at least one of the one or more induction coils to inductively melt the purified titanium sponge. An electrically conductive liner may be inserted in the electric induction cold crucible.

The above, and other aspects of the invention, are further set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
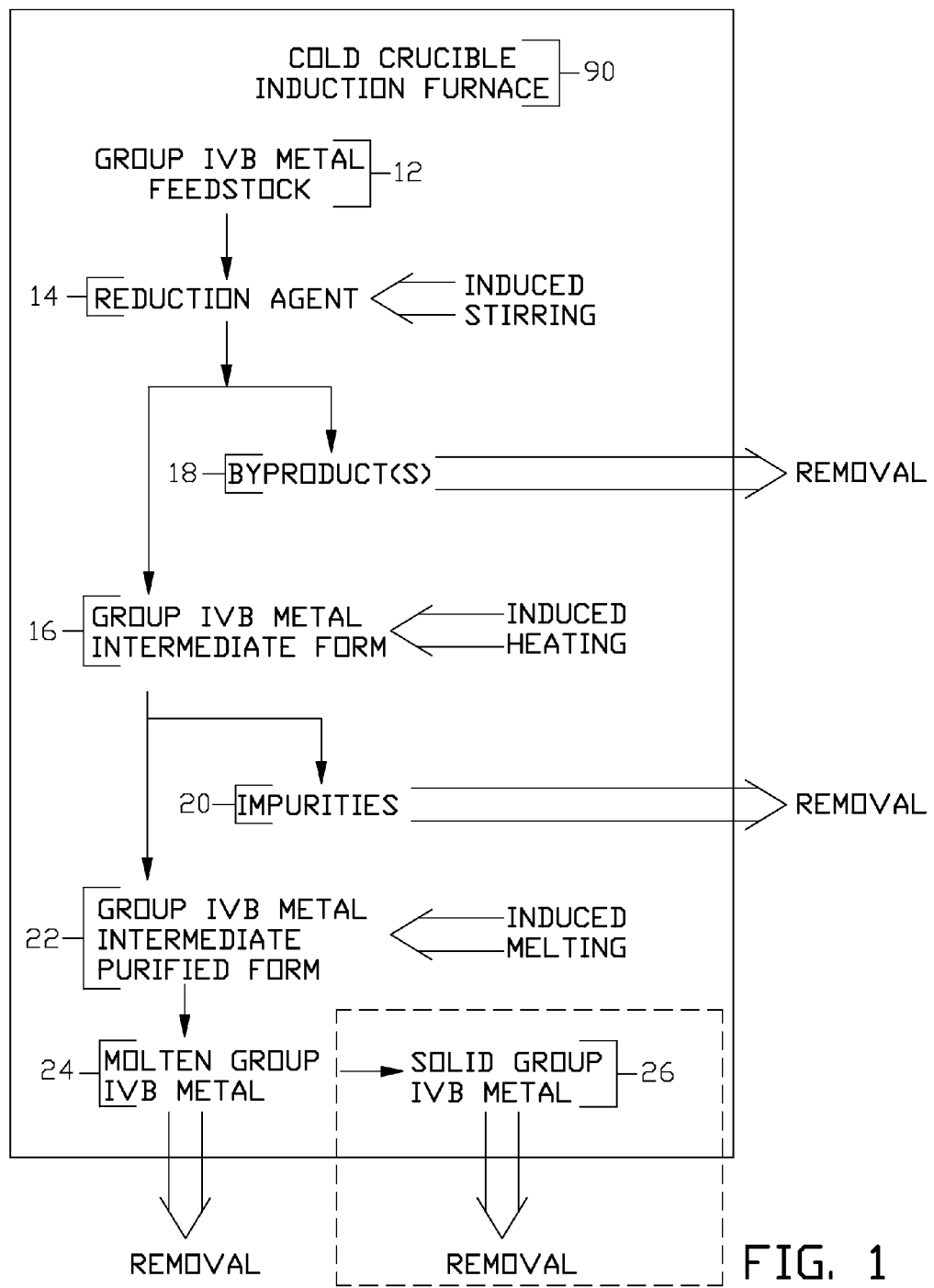
FIG. 1 is a diagram illustrating one example of the present invention for processing a Group IVB metal.

The following examples of the present invention for processing a Group IVB metal, such as titanium, are referred to, in general, as the Fishman process.

In one example of the present invention, a sealable reaction vessel is used for reducing a feedstock of a Group IVB metal into an intermediate form of a Group IVB metal. The vessel is formed, at least in part, with side walls from a material, such as a copper or stainless steel alloy, that will allow penetration of an external magnetic field into the vessel so that the magnetic field can couple with an electrically conductive component in a reactant bath liquid in the vessel. The external magnetic field can be generated by at least partially surrounding the outside of the side walls of the vessel with one or more induction coils that are supplied current from one or more suitable ac power sources. A reduction agent is introduced into the vessel, along with a feedstock of the Group IVB metal, to form the reactant bath liquid under an inert atmosphere. A suitable stirring ac current is supplied to one or more of the induction coils surrounding the vessel to inductively stir the liquid during the reduction process when an intermediate form of the Group IVB metal is formed in the vessel. One or more byproducts may be produced in the vessel during the reduction process. The intermediate form of the Group IVB metal may be removed from the vessel, or alternatively, after removal of the one or more byproducts from the vessel, a suitable heating ac current is supplied to one or more of the induction coils surrounding the vessel to inductively heat the intermediate form of the Group IVB metal to a sufficient temperature that releases the one or more byproducts from the intermediate form of the Group IVB metal, for example, by evaporation, to leave a purified intermediate form of the Group IVB metal that can be removed from the vessel for further processing.

When the Group IVB metal is titanium, the feedstock in the above description of the invention is primarily titanium tetrachloride, and the reducing agent is molten magnesium. The magnesium is inductively stirred in the vessel while titanium tetrachloride is added to the vessel in a manner consistent with the reduction phase of a Kroll process without inductive stirring. The magnesium may also be inductively heated in the vessel, or solid magnesium may be inductively melted in the vessel. The titanium tetrachloride is reduced to an intermediate form of titanium, namely titanium sponge, and primarily magnesium dichloride is produced as a byproduct, which can be withdrawn from the vessel. The inductive stirring of the reactant bath results in an increased weight of titanium sponge due, at least in part, to a more uniform and dense concentration of titanium sponge than that achievable without inductive stirring during the reduction process.

In another example of the present invention, the process vessel for the Fishman process comprises an electric induction cold crucible furnace, with modified operation of the furnace as described herein. The typical cold crucible induction furnace comprises a slotted wall and base that form a container for a metal that is heated and melted by electric induction. One or more induction coils surround the exterior of the container so that when an ac current flows through the one or more coils a magnetic field is generated. The field couples with the metal in the container to inductively heat and electromagnetically stir the metal. Heating and stirring is selectively achieved by controlling the parameters of the magnetic field. The segmented wall, and also the base in some designs, of the crucible are cooled by the flow of a cooling medium through the wall segments and the base; if the base is cooled. In operation as a melting furnace, a "skull" of frozen molten metal is formed adjacent to the segmented wall and base to isolate the molten metal in the crucible from the wall and base. See U.S. Pat. No. 4,058,668 for a typical cold crucible induction furnace. The process of the present invention may be accomplished in any suitable cold crucible induction furnace.

Referring to FIG. 1, in one example of the present invention, a Group IVB metal feedstock 12 is gradually added to a reduction agent 14 in electric induction cold crucible furnace 90. The reactant bath formed by feedstock 12 and reduction agent 14 is inductively stirred by supplying an ac stirring current to one or more induction coils surrounding the cold crucible during the reduction process when an intermediate form 16 of the Group IVB metal is formed in the crucible while producing one or more byproducts 18. Preferably, but not by way of limitation, the frequency for the stir current is in the range of 1 to 100 kiloHertz. Generally the applied induced stirring power is of low magnitude so that the intermediate form of the Group IVB metal is not melted.

The induced stirring patterns will depend upon a particular application. For example, stirring may not begin until after initiating the gradual feed of the reduction agent into the cold crucible, or stirring may be intermittent, and at various frequencies, during the reduction process. Arrangement of the one or more induction coils will also influence the stir program. For example, stir profiles may be (1) upward fluid motion in the central interior region of the crucible and downward fluid motion around the interior wall of the crucible, or (2) downward fluid motion in the central interior region of the crucible and upward fluid motion around the interior wall of the crucible.

Byproducts 18 can be evacuated from the cold crucible and the intermediate form 16 can be inductively heated by supplying an ac heating current to one or more of the induction coils surrounding the cold crucible. Generally the applied induced heat power is of sufficient magnitude to evaporate, or otherwise release, one or more impurities 20 from the intermediate form 16, but not sufficient to melt the intermediate form 16. After removal of the one or more impurities 20 from the cold crucible, a purified intermediate form 22 of the Group IVB metal remains in the crucible.

The purified intermediate form 22 of the Group IVB metal can be inductively melted by supplying an ac melting current to one or more of the induction coils surrounding the cold crucible. In this step the cold crucible operates as a cold crucible melting furnace in which a skull forms between the furnace and the molten form 24 of the Group IVB metal in the crucible. The molten form 24 of the Group IVB metal can be suitably removed from the cold crucible, for example, by pouring from the cold crucible, bottom draining from the cold crucible, or pressurized filing of a container from the cold crucible. Alternatively the molten form 24 of the Group IVB metal can be allowed to transition to a solidified form 26 of the Group IVB metal in the crucible, which can them be removed from the cold crucible as a solid ingot.

Figure 2:
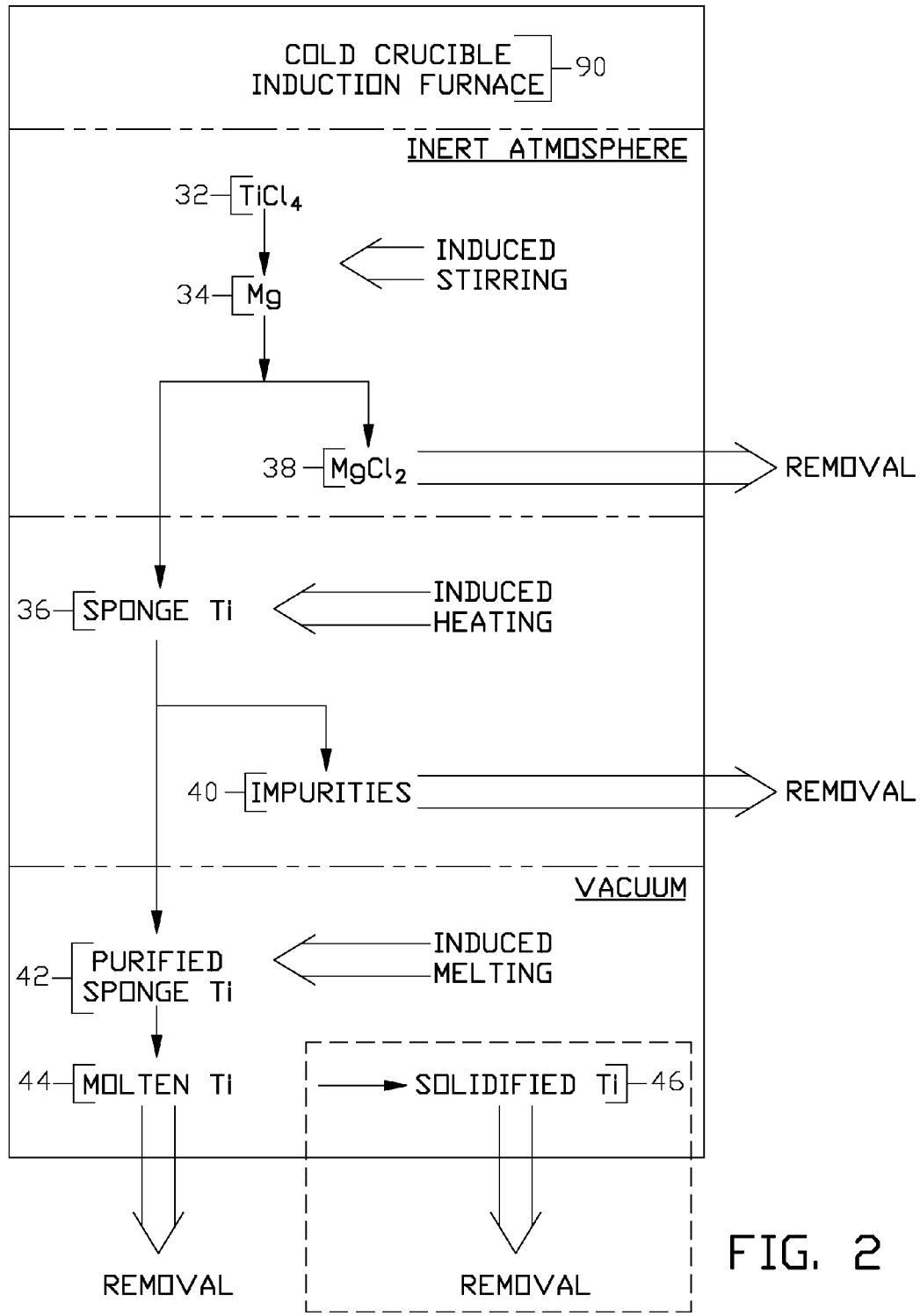
FIG. 2 is a diagram illustrating one example of the present invention for processing titanium.

For the above cold crucible process, when the Group IVB metal to be produced is titanium, referring to FIG. 2, the feedstock is titanium tetrachloride ($TiCl_4$) 32, which is gradually added to the reduction agent, magnesium (Mg) 34, in the cold crucible under an inert atmosphere, such as argon. The cold crucible can, either itself, be sealable from ambient, or located in a chamber that can be sealable from ambient. The reactant bath formed by the titanium tetrachloride and magnesium is inductively stirred by supplying an ac stirring current to one or more induction coils surrounding the cold crucible during the reduction process when an intermediate form of titanium, namely sponge titanium 36, is formed in the crucible while producing magnesium dichloride ($MgCl_2$) 38 as a byproduct. The magnesium dichloride can be removed from the cold crucible by any suitable method. For example a drain conduit formed from a suitable material, such as a ceramic, can be emerged in the liquid reactant bath to draw the magnesium dichloride from the cold crucible as the reduction process proceeds. The magnesium in the cold crucible can also be heated, if necessary, by electric induction. Any heat generated by the process can be removed by the fluid medium flowing through the segmented walls of the cold crucible. As noted above, a particular induced stirring pattern, including the time period, or multiple time periods, at which stirring is achieved, will depend upon a particular application.

After producing a desired weight of titanium sponge 36 in cold crucible 90, gases can be withdrawn from the cold crucible by drawing a vacuum. The titanium sponge and impurities 40, primarily unreacted magnesium and remaining magnesium chloride, can be inductively heated by applying an ac heating current to the one or more induction coils. The temperature in the cold crucible is sufficiently raised to evaporate the remaining magnesium and magnesium chloride, but not melt the titanium sponge. Heating can be achieved by increasing the applied power to the one or more induction coils surrounding the crucible to a suitable evaporation induction heating power level, and the evaporated impurities can be withdrawn from the cold crucible, which leaves purified titanium sponge 42 in the crucible.

Increasing the applied induction power to a suitable melting induction power level results in melting of the purified titanium sponge in the crucible. At this stage of the Fishman process, the cold crucible induction furnace functions as a conventional vacuum cold crucible induction furnace whereby a skull is formed between the wall and base of the crucible, and molten titanium is contained within the skull. Induced stirring of the molten titanium promotes the release of any further impurities that may remain in the melt. Optionally, at this stage, titanium feedstock, for example in the form of solid skull titanium from a previous cold crucible melting process, or alloy feed material, can be added to melt.

After purification and uniformity have been achieved by the melting and stirring stages, the molten titanium 44 can be removed from cold crucible 90 by any suitable method. For example, the molten titanium can be poured from the crucible, drained from the crucible by a bottom drain, or pressurized counter gravity filling of a container, for example, by applying a positive pressure to the surface of the molten titanium while the open end of a fill pipe is submerged in the molten titanium to draw the molten titanium through the fill pipe and into a container connected to the opposing end of the fill pipe. Alternatively the molten titanium may be allowed to transition to sold titanium 46 in the crucible, and be withdrawn from the crucible as a solid ingot.

In alternative examples of the invention, a liner, preferably formed from, but not limited to, the Group IVB metal being processed, can be inserted in the cold crucible prior to the addition of the feedstock of the Group IVB metal and the reduction agent. The liner may be formed from any material that will not significantly react with any of the materials used in the Fishman process. The liner may be shaped to fit against the interior wall and base of the crucible. When a liner is used, the stirring ac current and heating ac current is not within a frequency range that will melt the liner over the time periods that the stirring or heating ac current is applied, and the liner is configured, for example, in thickness, to allow stirring and heating ac currents to pass through the liner without inducing significant eddy currents in the liner. During the melting step of the intermediate form of the Group IVB metal in the crucible, the liner is melted with the intermediate form of the Group IVB metal.

Although a stirring, heating and melting induced ac current is referred to in different steps of the above examples of the invention, the induced ac current in one or more of the steps may also combine at least two of the three functions of stirring, heating and melting in other examples of the invention.

The above examples of the invention have been provided merely for the purpose of explanation, and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto, and changes may be made without departing from the scope of the invention in its aspects.

The invention claimed is:

1. A process for forming metallic titanium in purified form comprising the steps of:

provinding an inert atmosphere in an electric induction cold crucible surrounded by one or more induction coils;

placing magnesium in the electric induction cold crucible;

adding titanium tetrachloride to the magnesium;

supplying a stirring ac current to at least one of the one or more induction coils to induce circulation of the magnesium and titanium tetrachloride in the electric induction cold crucible;

reducing the titanium tetrachloride to titanium sponge and producing one or more byproducts including magnesium dichloride;

removing the one or more byproducts from the electric induction cold crucible;

purging the inert atmosphere from the electric induction cold crucible;

supplying a heating ac current to at least one of the one or more induction coils to release one or more impurities from the titanium sponge to form a purified titanium sponge in the electric induction cold crucible;

removing the one or more impurities from the electric induction cold crucible;

drawing a vacuum in the electric induction cold crucible; and supplying a melting ac current to at least one of the one or more induction coils to inductively melt the purified titanium sponge.

2. A process for forming metallic titanium in purified form comprising the steps of:

inserting an electrically conductive liner in an electric induction cold crucible surrounded by one or more induction coils;

providing an inert atmosphere in the electric induction cold crucible;

placing magnesium in the electrically conductively liner;

adding titanium tetrachloride to the magnesium;

supplying a stirring ac current to at least one of the one or more induction coils to induce circulation of the magnesium and titanium tetrachloride in the liner;

reducing the titanium tetrachloride to titanium sponge and producing one or more byproducts including magnesium dichloride;

removing the one or more byproducts from the electric induction cold crucible;

purging the inert atmosphere from the electric induction cold crucible;

supplying a heating ac current to at least one of the one or more induction coils to release one or more impurities from the titanium sponge to form a purified titanium sponge in the liner;

removing the one or more impurities from the electric induction cold crucible;

drawing a vacuum in the electric induction cold crucible; and supplying a melting ac current to at least one of the one or more induction coils to inductively melt the liner and the purified titanium sponge.

* * * * *